US012794163B2

(12) United States Patent
Huang

(10) Patent No.: US 12,794,163 B2
(45) Date of Patent: Nov. 10, 2026

(54) ULTRA-THIN CONNECTOR

(71) Applicant: HUIZHOU SANCHUANG TECHNOLOGY CO., LTD, Guangdong (CN)

(72) Inventor: Hailun Huang, Zhejiang (CN)

( * ) Notice: Subject to any disclaimer, the term of this patent is extended or adjusted under 35 U.S.C. 154(b) by 350 days.

(21) Appl. No.: 18/664,434

(22) Filed: May 15, 2024

(65) Prior Publication Data

US 2025/0323442 A1 Oct. 16, 2025

(30) Foreign Application Priority Data

Apr. 10, 2024 (CN) ......................... 202410430831.6

(51) Int. Cl.

*H01R 13/24* (2006.01)
*H01R 12/75* (2011.01)
*H01R 13/405* (2006.01)

(52) U.S. Cl.

CPC ......... *H01R 13/2435* (2013.01); *H01R 12/75* (2013.01); *H01R 13/405* (2013.01)

(58) Field of Classification Search

CPC ............................ H01R 13/2435; H01R 12/71
USPC ..................................... 439/81, 493, 78, 626
See application file for complete search history.

(56) References Cited

U.S. PATENT DOCUMENTS 5,873,739 A * 2/1999 Roberts .................. H01R 12/88 439/493
8,142,233 B2 * 3/2012 Niitsu .................... H01R 12/78 439/708
9,147,970 B2 * 9/2015 Hsu .................... H01R 13/6335
9,640,884 B2 * 5/2017 Sasame .............. H01R 13/6275
9,780,463 B2 * 10/2017 Seitz ....................... H01H 83/10
12,119,574 B2 * 10/2024 Agawa ................... H01R 12/53
12,548,931 B2 * 2/2026 Raybold ................ H01R 12/79
12,658,623 B2 * 6/2026 Wozniak ............ H01R 12/7082
2004/0235341 A1 * 11/2004 Chiu .................... H01R 12/771 439/495
2010/0055945 A1 * 3/2010 Lei ..................... H01R 13/2442 439/81

* cited by examiner

*Primary Examiner* — Hae Moon Hyeon
(74) *Attorney, Agent, or Firm* — Sandy Lipken

(57) ABSTRACT

Disclosed is an ultra-thin connector, including a main body, and the main body includes a board end and a wire end. The board end includes a board end housing, a cavity is formed in the board end housing, elastic terminals are arranged on opposing sides inside the cavity, and first locking structures for fastening the wire end are arranged on other opposing sides inside the cavity. The wire end includes a wire end housing buckled with the first locking structures, a protective cover fastened to the wire end housing, wire rods partly wrapped by the protective cover, and dual contact terminals with A and B contact ends. Second locking structures fastened to the protective cover are arranged on opposing sides inside the wire end housing. The preset disclosure has a compact structure.

8 Claims, 7 Drawing Sheets

ULTRA-THIN CONNECTOR

CROSS-REFERENCE TO RELATED APPLICATIONS

This application claims priority of Chinese Patent Application No. 202410430831.6, filed on Apr. 10, 2024, the entire contents of which are incorporated herein by reference.

TECHNICAL FIELD

The preset disclosure relates to the technical field of connector bodies and particularly relates to an ultra-thin connector.

BACKGROUND

With the rapid development of Internet information technology, hardware devices compatible with the Internet are also continuously updated and iterated. Many electronic products, especially connectors, are being continuously improved, becoming lighter, thinner, more compact, and easier to assemble. Some connectors of conventional structures available on the market cannot satisfy the requirements of use in ultra-thin spaces.

SUMMARY

To solve the problems existing in the prior art, the present disclosure provides an ultra-thin connector to solve the problem that some connectors of conventional structures available on the market cannot satisfy the requirements of use in ultra-thin spaces.

A technical solution provided by the present disclosure to solve the above technical problems is as follows: An ultra-thin connector includes a main body, and the main body includes a board end and a wire end fixed to the board end;

- the board end includes a board end housing, a cavity is formed on one side surface of the board end housing, at least one elastic terminal is arranged on opposing sides inside the cavity by means of assembly, plastic coating or pasting, and first locking structures for fastening the wire end are arranged on other opposing sides inside the cavity; and
- the wire end includes a wire end housing that is located inside the cavity and buckled with the first locking structures, a protective cover fastened to the wire end housing, wire rods partly wrapped by the protective cover, and dual contact terminals that are arranged at opposing ends of the wire end housing by means of assembly, plastic coating or pasting and have A contact ends that are in contact connection with the elastic terminals and B contact ends that are welded to the wire rods, where the A contact ends of the dual contact terminals are in one-to-one correspondence with the elastic terminals, and second locking structures fastened to the protective cover are arranged on opposing sides inside the wire end housing.

The present disclosure features the following beneficial effects: the cavity that is capable of accommodating the elastic terminals, the wire end housing and the dual contact terminals on the wire end is arranged on the board end housing, the protective cover wraps the wire rods, and terminals of the wire end are designed to have a dual-plane structure, which compresses the connection space to the maximum extent, thereby significantly reducing the volume of the connector, so that the connector can be applied in space-constrained situations. Further, the board end and the wire end are fixed to each other in a buckled manner, thus making assembly faster and more convenient.

On the basis of the above technical solution, the following improvements can be made to the present disclosure.

Further, protrusions with the height same as the depth of the cavity are uniformly spaced apart from each other inside the cavity at one end of the elastic terminal, a containing groove is formed between two adjacent protrusions, and the elastic terminal is arranged in the containing groove.

The beneficial effect of the above further technical solution lies in that the above setting facilitates the installation of the elastic terminals, avoids displacement of the elastic terminals during assembly, and ensures one-to-one correspondence between the elastic terminals and the dual contact terminals, thus guaranteeing the stability of the connector.

Further, gaps that penetrate through the cavity are formed on the board end housing at one end of the first locking structure, and the first locking structure is arranged at the gap.

The beneficial effect of the above further technical solution lies in that by arranging the first locking structure at the gap, the wire end easily stretches the first locking structure during assembly, so that the first locking structure is effectively buckled with the wire end, while the connection space is compressed to the greatest extent and the volume of the connector is reduced.

Further, the elastic terminal includes a fixed end connected to the board end housing, an elastic end that always forms an included angle against the fixed end, an arc-shaped connecting end that connects the fixed end and the elastic end, and a bent portion that bends towards the fixed end and is arranged on the elastic end away from the arc-shaped connecting end, where the fixed end, the elastic end, the arc-shaped connecting end, and the bent portion are integrated. An included angle is always maintained between the fixed end and the elastic end, so that the elastic terminal and the dual contact terminal are always in contact with each other, and contact stability is improved.

The beneficial effect of the above further technical solution lies in that this setting ensures contact between the elastic terminal and the dual contact terminal, and effectively prevents poor contact, improving product quality and extending its service life.

Further, the dual contact terminal further includes a U-shaped connecting end that is connected to both the A contact end and the B contact end, the A contact end and the B contact end are parallel to each other, the U-shaped connecting end is inserted into the wire end housing, and the A contact end and the B contact end are arranged on end surfaces of both sides of the wire end housing back to back through the U-shaped connecting end; and positioning grooves that wrap the A contact ends, the B contact ends and the U-shaped connecting ends are formed inside the wire end housing at one end of the dual contact terminal.

The beneficial effect of the above further technical solution lies in that setting of the U-shaped connecting end is capable of fixing the A contact end and the B contact end to the wire end housing, and setting of the positioning grooves on the wire end housing facilitates the installation of the dual contact terminals, while the connection space is compressed to the greatest extent and the volume of the connector is reduced.

Further, process holes are formed on the wire end housing between two opposite positioning grooves.

The beneficial effect of the above further technical solution lies in that setting of the process holes facilitates processing of the dual contact terminals that are oppositely arranged.

Further, at least four second locking structures are provided and symmetrically arranged on both sides of the wire end housing, and the wire end housing between two adjacent second locking structures is provided with a first buckling groove that is in fit with the first locking structure.

The beneficial effect of the above further technical solution lies in that this setting results in a compact structure and strong connection stability, effectively ensuring good contact between the wire end and the board end.

Further, through grooves that are capable of accommodating the wire rods are formed on one end surface of the protective cover, and second buckling grooves that are in fit with the second locking structures are formed on outer walls on both sides of the protective cover along the extension direction of the through grooves.

The beneficial effect of the above further technical solution lies in that through setting of the through grooves, the wire rods have two opposite outlets, thus having strong practicality; and the second locking grooves that are in fit with the second locking structure are arranged on a side edge of the protective cover to improve connection stability, so that the protective cover effectively protects the elastic terminals and the dual contact terminals.

Further, the bottom surface of the cavity is configured to be an arc-shaped surface.

The beneficial effect of the above further technical solution lies in that the bottom surface of the cavity is configured to be an arc-shaped surface, so that the elastic terminal is in contact with the A contact end effectively, thereby improving product stability.

The present disclosure has the following beneficial effects: The preset disclosure has a compact structure. To adapt to the usage environment, the preset disclosure, by means of dual-plane connection and welding, reduces the volume to the maximum extent, and can be applied in space-constrained situations. The cavity is formed on the board end housing to accommodate the terminals, which compresses the connection space to the greatest extent and reduces the volume of the connector, and the wire end and the board end are assembled by locking, which ensures high assembly efficiency and strong stability, effectively guaranteeing production quality.

Figure 1:
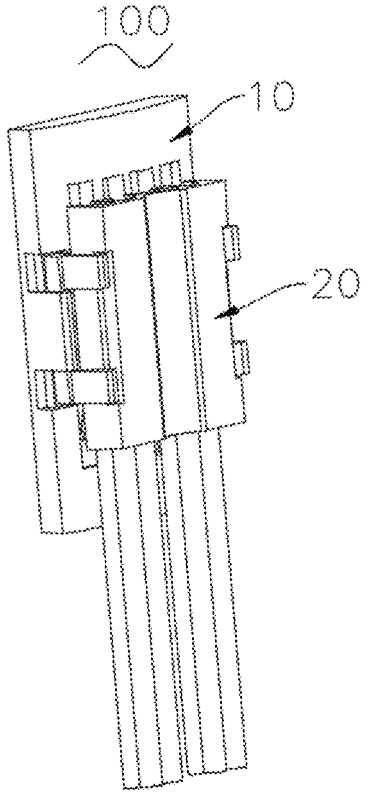
FIG. 1 is a schematic diagram of an overall structure of the present disclosure.

In the accompanying drawings, components represented by reference numerals are listed as follows:

100, main body;

10, board end, 11, board end housing, 110, gap, 12, cavity, 13, first locking structure, 14, elastic terminal, 140, fixed end, 141, elastic end, 142, arc-shaped connecting end, 143, bent portion, 15, protrusion, 16, containing groove;

20, wire end, 21, wire end housing, 210, positioning groove, 211, process hole, 212 first buckling groove, 22, protective cover, 220, through groove, 221, second buckling groove, 23, wire rod, 24, dual contact terminal, 240, A contact end, 241, B contact end, 242, U-shaped connecting end, 25, second locking structure.

DETAILED DESCRIPTIONS OF THE EMBODIMENTS

The principles and features of the present disclosure are described below in combination with the accompanying drawings. The examples described herein are only illustrative of the present disclosure and are not intended to limit the scope of the present disclosure.

Connectors are components that electronic engineering technicians often use. A connector is purely used to set up a bridge for an interrupted circuit or between isolated circuits, so that the circuit is capable of achieving the pre-defined function after being turned on. Connectors are indispensable components of electronic devices. One or more connectors can always be found along the flowing path of electric current. With the rapid development of Internet information technology, hardware devices compatible with the Internet are also continuously updated and iterated. Many electronic products, especially connectors, are being continuously improved, becoming lighter, thinner, more compact, and easier to assemble. Some connectors of conventional structures available on the market cannot satisfy the requirements of use in ultra-thin spaces. In view of this, the inventor has proposed an ultra-thin connector to solve the problem that some connectors of conventional structures available on the market cannot satisfy the requirements of use in ultra-thin spaces.

The present disclosure provides the following preferred embodiment.

Figure 10:
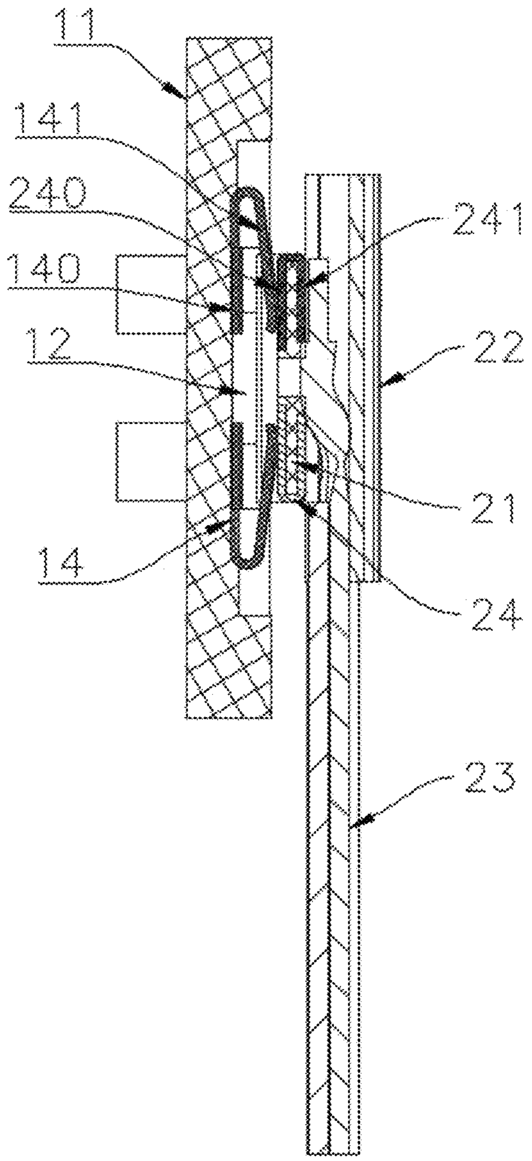
FIG. 10 is a sectional view of an overall structure of the present disclosure from one angle.
Figure 11:
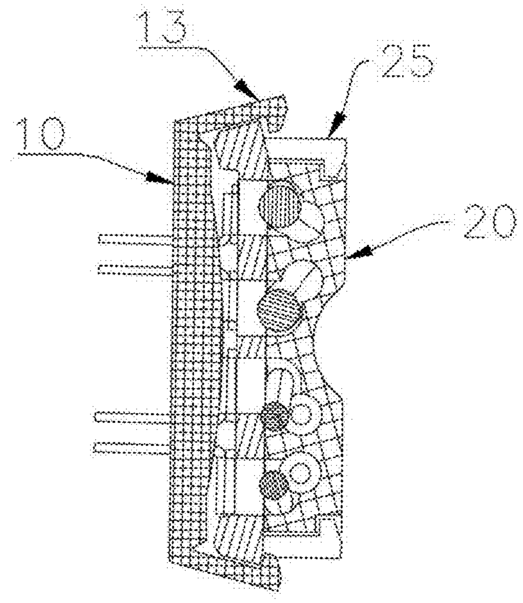
FIG. 11 is a sectional view of an overall structure of the present disclosure from another angle.

As shown in FIGS. 1, 10 and 11, an ultra-thin connector is provided, and the ultra-thin connector includes a main body 100. The main body 100 includes a board end 10 and a wire end 20, where the board end 10 is fixedly connected to the wire end 20 in a buckled manner, and the buckling effectively improves assembly efficiency and stability while reducing the use of metal parts. In other embodiments, the board end 10 and the wire end 20 can be connected by means of screws, pasting or other methods, which will not be repeated here.

Figure 2:
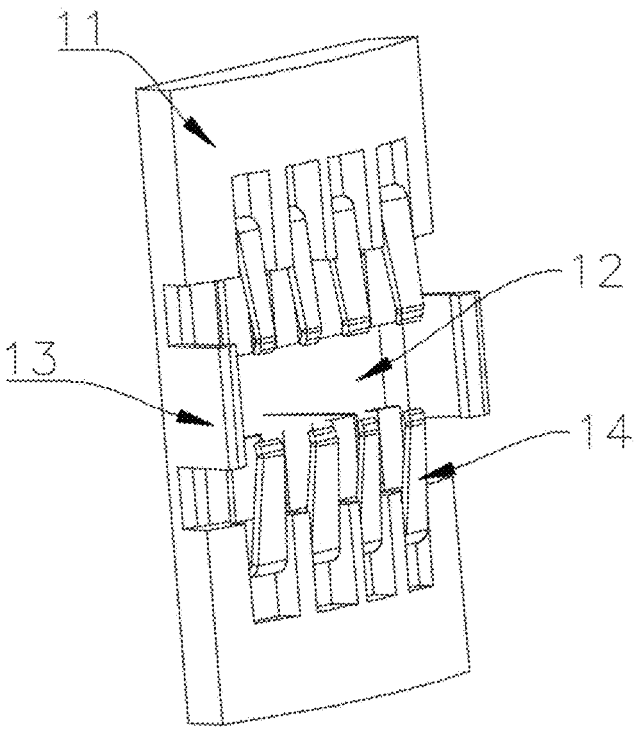
FIG. 2 is a schematic diagram of a board end of the present disclosure.

In this embodiment, as shown in FIG. 2, the board end 10 includes a board end housing 11, a cavity 12 is formed on one side surface of the board end housing 11 in the width direction, and first locking structures 13 are arranged on both left and right sides of the cavity 12 to fasten the wire end 20. A plurality of elastic terminals 14 are oppositely arranged on both upper and lower sides of the cavity 12, protrusions 15 with the height same as the depth of the cavity 12 are uniformly spaced apart from each other inside the cavity 12 at one end of the elastic terminal 14, a containing groove 16 is formed between two adjacent protrusions 15, and the elastic terminal 14 is arranged in the containing groove 16, such that the plurality of elastic terminals 14 are symmetrically spaced apart from each other inside the cavity 12.

In this embodiment, the number of the elastic terminals 14 is set to 8, and two elastic terminals 14 are symmetrically arranged in each containing groove 16. It should be noted that the number of the elastic terminals 14 can be set according to needs, and can be 2, 4, 6, 10, etc., in multiples of 2. When necessary, the number of the elastic terminals 14 can also be in multiples of 1, odd or even, and the number of the elastic terminals 14 can be set according to needs.

Figure 4:
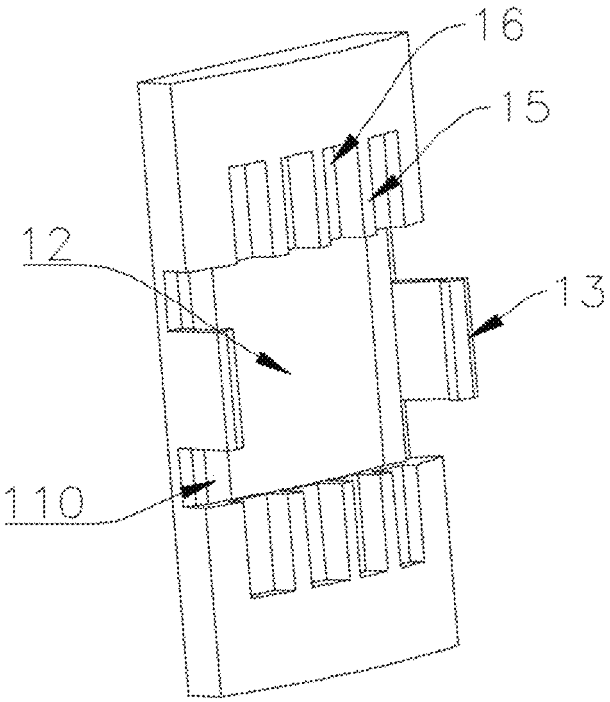
FIG. 4 is a schematic diagram of a board end housing of the present disclosure.

Furthermore, as shown in FIG. 4, the elastic terminal 14 can be directly assembled in the containing groove 16, and the width of the containing groove 16 is configured to be smaller than the width of the elastic terminal 14, so that the elastic terminal 14 is embedded in the containing groove 16. The elastic terminal 14, by means of plastic coating, is capable of injection-molding the board end housing 11 onto the elastic terminal 14, so that the board end housing 11 partially wraps the elastic terminal 14, thereby fixing the board end housing 11 and the elastic terminal 14. The elastic terminal 14, by means of pasting, can also be installed in the containing groove 16, and the elastic terminal 14 is fixed in the containing groove 16 by applying glue to the surface of the elastic terminal 14 or inside the containing groove 16.

Figure 3:
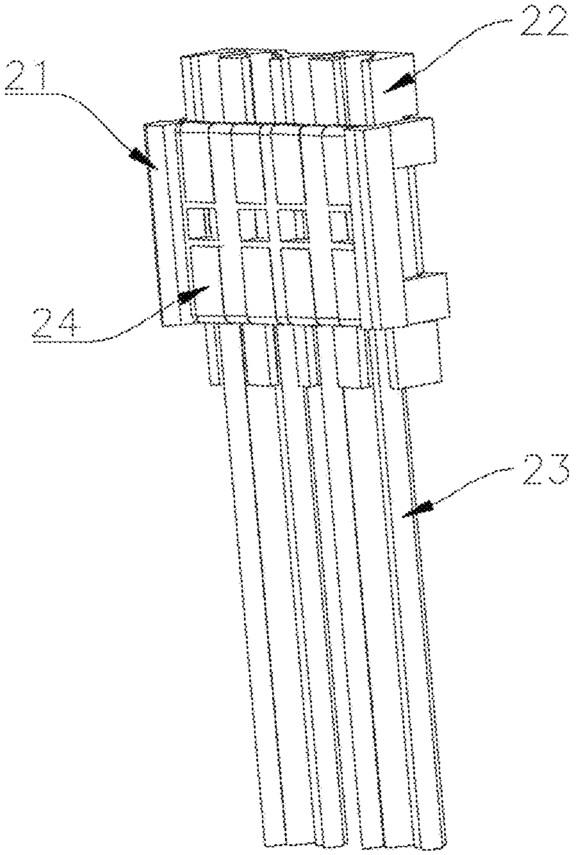
FIG. 3 is a schematic diagram of a wire end of the present disclosure.

In this embodiment, as shown in FIG. 3, the wire end 20 includes a wire end housing 21, a protective cover 22, wire rods 23, and dual contact terminals 24, where the dual contact terminals 24 are arranged on the wire end housing 21, second locking structure 25 configured for fastening the protective cover 22 are arranged on both left and right sides of the wire end housing 21, and the wire rods 23 are partially wrapped by the protective cover 22, so that the wire rods 23 and the dual contact terminals 24 are easily welded together, and the wire end housing 21 is located inside the cavity 12 and fastened by the first locking structures 13.

Figure 6:
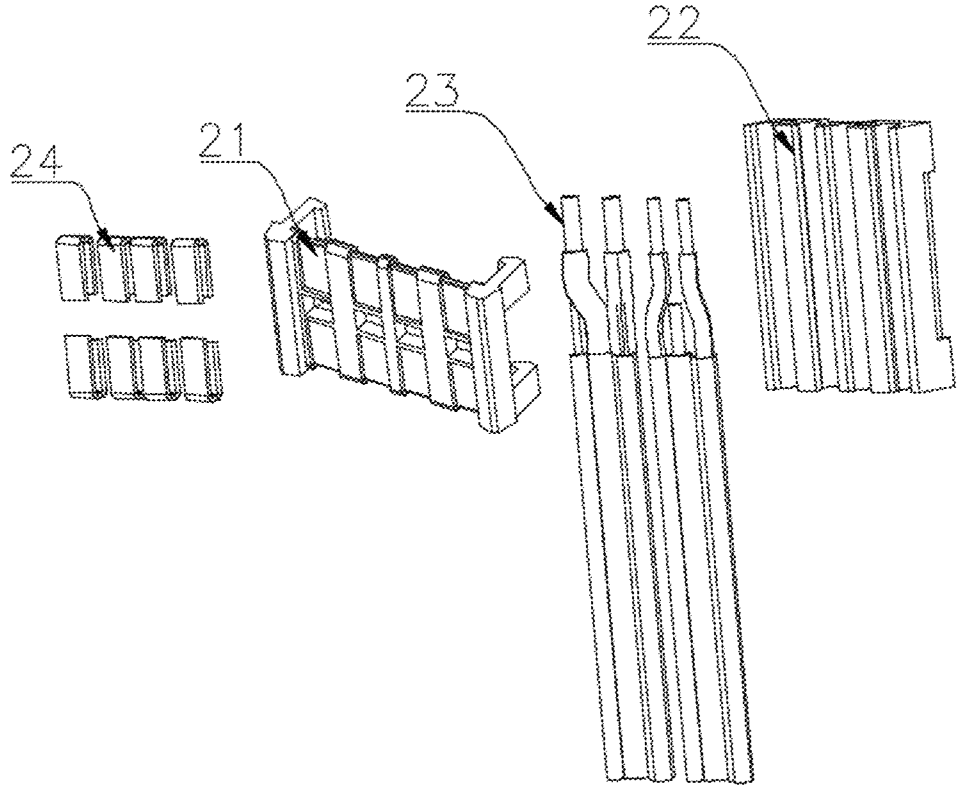
FIG. 6 is an explosive view of a wire end of the present disclosure.
Figure 7:
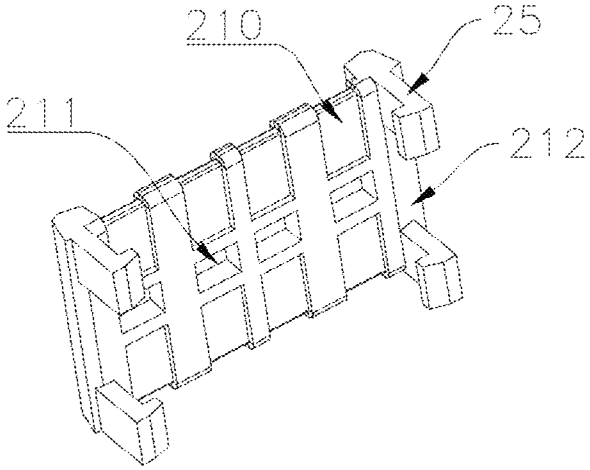
FIG. 7 is a schematic diagram of a wire end housing of the present disclosure.

As shown in FIGS. 6 and 7, the dual contact terminals 24 are configured to electrically connect or communicate with the elastic terminals 14, the number of the dual contact terminals 24 is consistent with the number of the elastic terminals 14, and the dual contact terminals 24 are arranged on both upper and lower sides of the wire end housing 21, and are in in one-to-one correspondence with the elastic terminals 14. To facilitate the assembly of the dual contact terminals 24 on the wire end housing 21, positioning grooves 210 are formed on the wire end housing 21, the positioning grooves 210 correspond to the containing grooves 16, and the width of the positioning groove 210 is configured to be smaller than the width of the dual contact terminal 24, so that the dual contact terminals 24 are fixedly assembled on the wire end housing 21.

Further, in other embodiments, the contact terminal 24, by means of plastic coating, is capable of injection-molding the wire end housing 21 onto the dual contact terminal 24, so that the wire end housing 21 partially wraps the dual contact terminal 24, thereby fixing the wire end housing 21 and the dual contact terminal 24. In other examples, the dual contact terminal 24, by means of pasting, can also be installed on the wire end housing 21, and the dual contact terminal 24 is fixed in the positioning groove 210 after glue applied to the surface of the dual contact terminal 24 or inside the positioning groove 210 is hardened.

Figure 5:
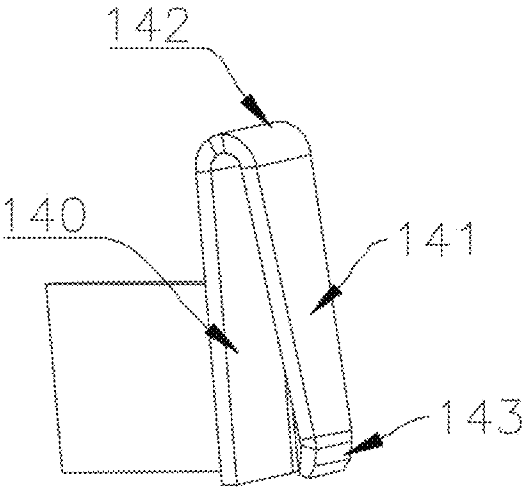
FIG. 5 is a schematic diagram of an elastic terminal of the present disclosure.

In this embodiment, as shown in FIG. 5, the elastic terminal 14 includes a fixed end 140 connected to the board end housing 11, an elastic end 141 that always forms an included angle against the fixed end 140, an arc-shaped connecting end 142 that connects the fixed end 140 and the elastic end 141, and a bent portion 143 that bends towards the fixed end 140 and is arranged on the elastic end 141 away from the arc-shaped connecting end 142, where the fixed end 140, the elastic end 141, the arc-shaped connecting end 142, and the bent portion 143 are integrated. An included angle is always maintained between the fixed end 140 and the elastic end 141, so that the elastic terminal 14 and the dual contact terminal 24 are always in contact with each other, and contact stability is improved.

Figure 8:
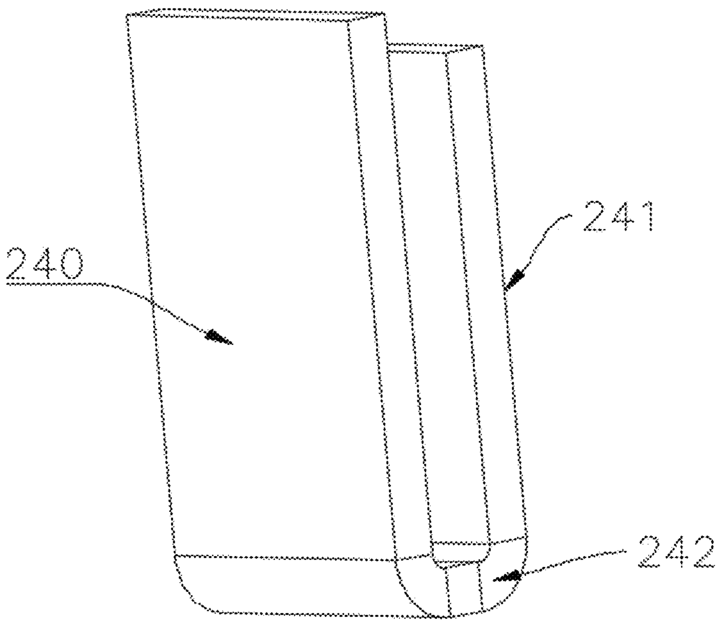
FIG. 8 is a schematic diagram of a dual contact terminal of the present disclosure.

In this embodiment, as shown in FIG. 8, the dual contact terminal 24 includes an A contact end 240, a B contact end 241 and a U-shaped connecting end 242, where the U-shaped connecting end 242 is connected to both the A contact end 240 and the B contact end 241, the A contact end 240 and the B contact end are parallel to each other, and the A contact end 240, the B contact end and the U-shaped connecting end 242 are integrated. The A contact end 240 is in contact with the elastic end 141, and the B contact end is welded to the wire rod 23. The U-shaped connecting end 242 is inserted into the positioning groove 210 formed on the wire end housing 21, and the A contact end 240 and the B contact end are arranged on end surfaces of both sides of the wire end housing 21 back to back through the U-shaped connecting end 242. When the board end 10 and the wire end 20 are assembled, the A contact end 240 contacts and presses the elastic end 141, so that the elastic end 141 presses and moves closer to the fixed end 140, the bent portion 143 pushes the elastic end 141 outward, and when the elastic end 141 is pressed, the bent portion 143 always forms an included angle against the fixed end 140 and remains contact with the A contact end 240, thus preventing poor contact and ensuring product quality.

To ensure better and more effective contact between the A contact end 240 and the elastic end 141, the bottom surface of the cavity 12 is configured to be an arc-shaped surface (as shown in FIG. 11). The bottom surface of the cavity 12 is configured to be an arc-shaped surface, so that the elastic terminal 14 is in contact with the A contact end 240 effectively, thereby improving product stability.

Figure 12:
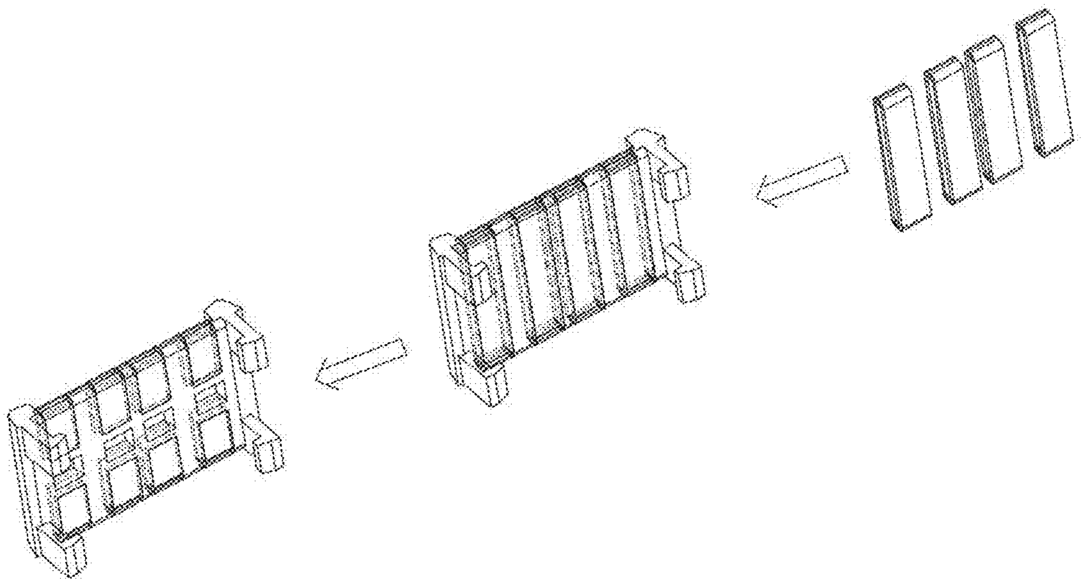
FIG. 12 is a flowchart of assembly of a wire end housing and dual contact terminals.

Preferably, to avoid installing the dual contact terminals 24 onto the wire end housing 21 one by one and improve assembly efficiency, as shown in FIG. 12, two upper and lower dual contact terminals 24 are integrally-connected, the wire end housing 21 is plastic-coated onto the integrated dual contact terminal 24, and then the integrated dual contact terminal 24, by means of blanking die or cutter, is blanked or cut into the dual contact terminal 24 with upper and lower parts thereof separated from each other, so that a process hole 211 is formed on the wire end housing 21. Two dual contact terminals 24 are integrally-connected, which avoids assembling individual dual contact terminals 24 onto the wire end housing 21 one by one, and reduces manual labor intensity. Production efficiency is improved by blanking or cutting the integrated dual contact terminal 24 into two independent dual contact terminals 24 by means of blanking die or cutter.

In this embodiment, as shown in FIG. 7, at least four second locking structures 25 are provided and symmetrically arranged on both sides of the wire end housing 21. The wire end housing 21 between two adjacent second locking structures 25 is provided with a first buckling groove 212 that is in fit with the first locking structure 13. This setting results in a compact structure and strong connection stability, effectively ensuring good contact between the wire end 20 and the board end 10.

Figure 9:
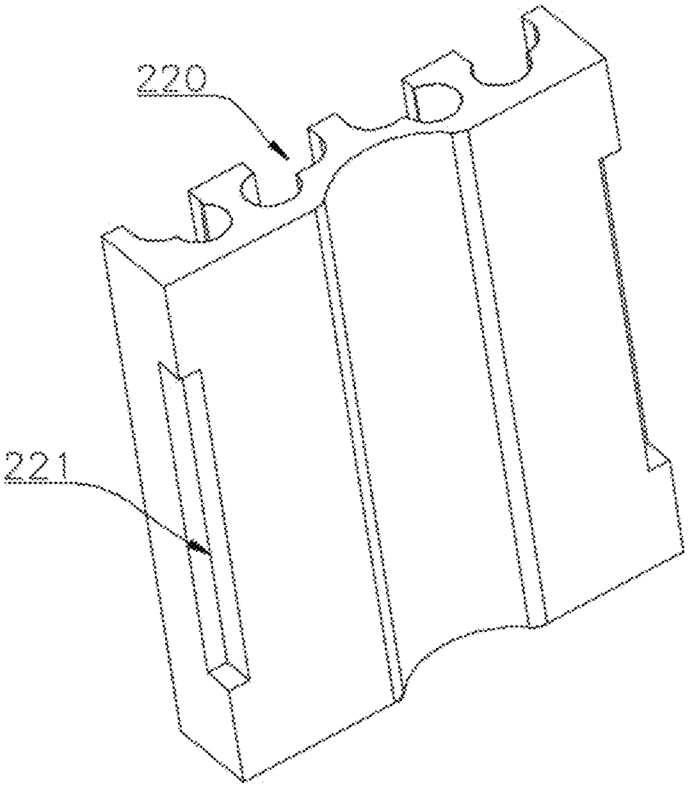
FIG. 9 is a schematic diagram of a protective cover of the present disclosure.

Furthermore, as shown in FIG. 9, through grooves 220 that are capable of accommodating the wire rods 23 are formed on one end surface of the protective cover 22, and second buckling grooves 221 that are in fit with the second locking structures 25 are formed on outer walls on both sides of the protective cover 22 along the extension direction of the through grooves 220. In this embodiment, the first locking structures 13 and the second locking structures 25 are inverted buckle structures formed on the board end housing 11 and the wire end housing 21. Through setting of the through grooves 220, the wire rods 23 have two opposite outlets, thus having strong practicality. The second locking grooves 221 that are in fit with the second locking structure 25 are arranged on a side edge of the protective cover 22 to improve connection stability, so that the protective cover 22 effectively protects the elastic terminals 14 and the dual contact terminals 24. During assembly, the wire end housing 21 and the protective cover 22 are fastened first, and then the assembled components of the wire end housing 21 and the protective cover 22 are fastened to the board end housing 11, so that the board end 10 and the wire end 20 are assembled into the main body 100.

Preferably, as shown in FIG. 4, gaps 110 that penetrate through the cavity 12 are formed on the board end housing 11 at one end of the first locking structure 13, and the first locking structure 13 is arranged at the gap 110. By arranging the first locking structure 13 at the gap 110, the wire end 20 easily stretches the first locking structure 13 during assembly, so that the first locking structure 13 is effectively buckled with the wire end 20, while the connection space is compressed to the greatest extent and the volume of the connector is reduced.

In summary, in the present disclosure, the cavity 12 that is capable of accommodating the elastic terminals 14, the wire end housing 21 and the dual contact terminals 24 on the wire end 20 is arranged on the board end housing 11, the protective cover 22 wraps the wire rods 23, and terminals of the wire end 20 are designed to have a dual-plane structure, which compresses the connection space to the maximum extent, thereby significantly reducing the volume of the connector, so that the connector can be applied in space-constrained situations. Further, the board end 10 and the wire end 20 are fixed to each other in a buckled manner, thus making assembly faster and more convenient.

In the present disclosure, unless otherwise explicitly specified and defined, the terms "mounting", "connecting", "connection", "fixing", etc. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements. For those of ordinary skill in the art, the specific meanings of the above terms in the present disclosure may be understood according to specific circumstances.

Unless otherwise defined, technical terms or scientific terms used herein should have the usual meaning understood by those ordinarily skilled in the art to which the present disclosure belongs. The words "first", "second", and the like used in the description and claims of the application of the present disclosure do not indicate any order, quantity or importance, but are used only to distinguish different components. Likewise, the words "a" or "one", and the like do not indicate any limitations on quantity, but rather indicate the presence of at least one.

In the description of the present disclosure, it should be noted that the terms "upper", "lower", "left", "right", "inner", "outer", etc. indicate azimuthal or positional relations based on those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present disclosure.

The foregoing descriptions are merely exemplary embodiments of the present disclosure, but are not intended to limit the present disclosure. Any modification, equivalent replacement or improvement derived within the spirit and principle of the present disclosure shall all fall within the protection scope of the present disclosure.

The invention claimed is:

1. An ultra-thin connector, comprising a main body, wherein the main body comprises a board end and a wire end fixed to the board end;

the board end comprises a board end housing, a cavity is formed on one side surface of the board end housing, at least one elastic terminal is arranged on opposing sides inside the cavity by means of assembly, plastic coating or pasting, and first locking structures for fastening the wire end are arranged on other opposing sides inside the cavity; and the wire end comprises a wire end housing that is located inside the cavity and buckled with the first locking structures, a protective cover fastened to the wire end housing, wire rods partly wrapped by the protective cover, and dual contact terminals that are arranged at opposing ends of the wire end housing by means of assembly, plastic coating or pasting and have A contact ends that are in contact connection with the elastic terminals and B contact ends that are welded to the wire rods, wherein the A contact ends of the dual contact terminals are in one-to-one correspondence with the elastic terminals, and second locking structures fastened to the protective cover are arranged on opposing sides inside the wire end housing.

2. The ultra-thin connector according to claim 1, wherein protrusions with the height same as the depth of the cavity are uniformly spaced apart from each other inside the cavity at one end of the elastic terminal, a containing groove is formed between two adjacent protrusions, and the elastic terminal is arranged in the containing groove.

3. The ultra-thin connector according to claim 2, wherein gaps that penetrate through the cavity are formed on the board end housing at one end of the first locking structure, and the first locking structure is arranged at the gap.

4. The ultra-thin connector according to claim 3, wherein the elastic terminal comprises a fixed end connected to the board end housing, an elastic end that always forms an included angle against the fixed end, an arc-shaped connecting end that connects the fixed end and the elastic end, and a bent portion that bends towards the fixed end and is arranged on the elastic end away from the arc-shaped connecting end, wherein when the A contact end contacts and presses the elastic end, the elastic end presses the fixed end, and the bent portion pushes the elastic end outward, and when the elastic end is pressed, the bent portion always forms an included angle against the fixed end and remains contact with the A contact end.

5. The ultra-thin connector according to claim 1, wherein the dual contact terminal further comprises a U-shaped connecting end that is connected to both the A contact end and the B contact end, the A contact end and the B contact end are parallel to each other, the U-shaped connecting end is inserted into the wire end housing, and the A contact end and the B contact end are arranged on end surfaces of both sides of the wire end housing back to back through the U-shaped connecting end.

6. The ultra-thin connector according to claim 5, wherein positioning grooves that wrap the A contact ends, the B contact ends and the U-shaped connecting ends are formed inside the wire end housing at one end of the dual contact terminal.

7. The ultra-thin connector according to claim 1, wherein at least four second locking structures are provided and symmetrically arranged on both sides of the wire end housing, and the wire end housing between two adjacent second locking structures is provided with a first buckling groove that is in fit with the first locking structure.

8. The ultra-thin connector according to claim 1, wherein through grooves that are capable of accommodating the wire rods are formed on one end surface of the protective cover, and second buckling grooves that are in fit with the second locking structures are formed on outer walls on both sides of the protective cover along the extension direction of the through grooves.

* * * * *